No. 778,626. PATENTED DEC. 27, 1904.
F. H. BOGART.
STEERING MECHANISM FOR AUTOMOBILES.
APPLICATION FILED SEPT. 20, 1904.
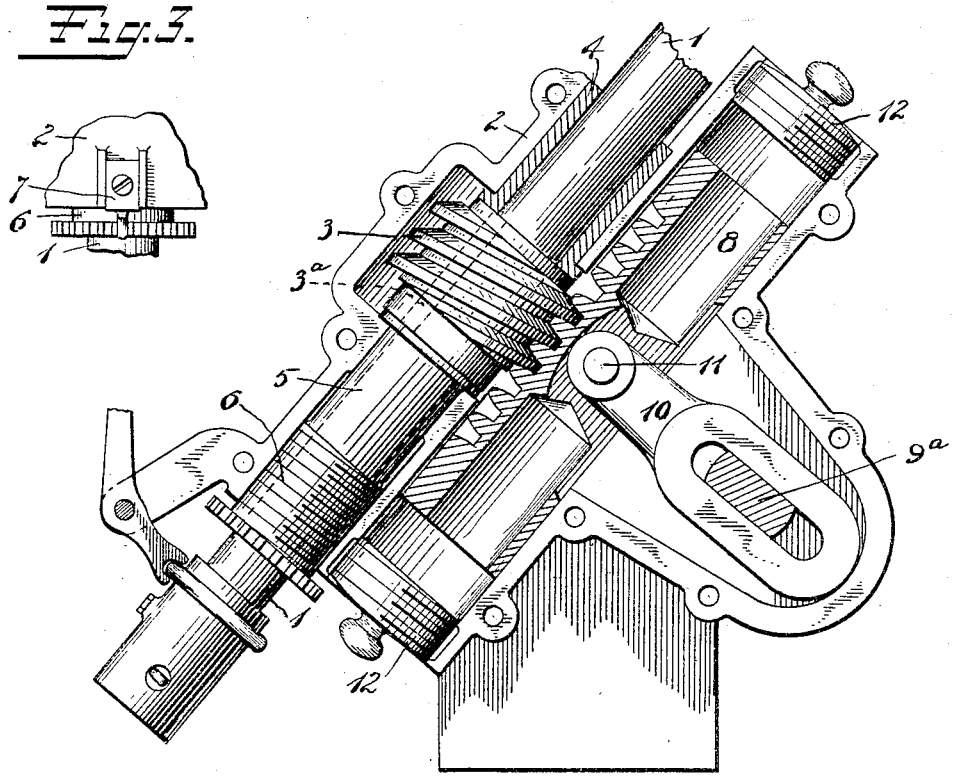
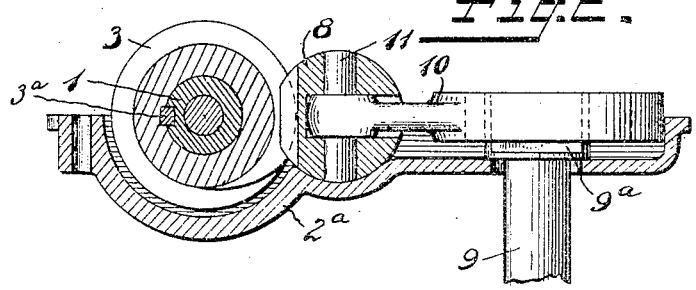
Witnesses
Inventor
Fred H. Bogart.
By his Attorneys No. 778,626.

Patented December 27, 1904.

UNITED STATES PATENT OFFICE.

FRED H. BOGART, OF NEW BRITAIN, CONNECTICUT, ASSIGNOR TO THE CORBIN MOTOR VEHICLE CORPORATION, OF NEW BRITAIN, CONNECTICUT, A CORPORATION OF CONNECTICUT.

STEERING MECHANISM FOR AUTOMOBILES.

SPECIFICATION forming part of Letters Patent No. 778,626, dated December 27, 1904.

Application filed September 20, 1904. Serial No. 225,172.

*To all whom it may concern:*

Be it known that I, FRED H. BOGART, a citizen of the United States, residing at New Britain, in the county of Hartford, State of Connecticut, have invented certain new and useful Improvements in Steering Mechanism for Automobiles and the Like, of which the following is a full, clear, and exact description.

My invention relates to improvements in steering mechanism for automobiles and the like.

The main object of my invention is to provide certain improved features of construction whereby the steering apparatus is rendered durable and effective and the danger of wear reduced to a minimum.

In the accompanying drawings, Figure 1 is a side elevation of those parts of the apparatus to which my invention particularly relates, one side of the casing being removed to show the internal working parts, the latter being partly in section and partly in elevation. Fig. 2 is a section of part of the casing, showing the internal mechanism partly in plan and partly in section. Fig. 3 is a view of detached detail of construction.

1 is a post or shaft upon the head of which the usual steering-wheel (not shown) is mounted. This shaft projects into a housing or case, which may be made in two separable parts or sections, as indicated at 2 $2^a$.

3 is a worm splined at $3^a$ upon the shaft 1, so as to turn therewith.

4 is a bushing in the upper part of the case 2, and 5 is a bushing in the lower part of the case 2. Through these bushings the shaft 1 passes.

6 is a screw-threaded adjusting-sleeve in the lower part of the case 2 $2^a$, the inner end of said sleeve bearing against the end of bushing 5. The adjusting-sleeve 6 may have a notched head at its outer end, whereby it may be engaged by a clip 7, carried by the case 2, by means of which it may be held rigidly against dislocation after proper adjustment has been effected.

8 is a reciprocating member or plunger which is arranged to take a long bearing in the case 2 $2^a$ and move in a plane parallel with said shaft. This member 8 has teeth on one side pitched to correspond with the threads of the worm 3 and with which said teeth worm engages.

9 is a shaft to which the usual laterally-projecting lever-arm is secured and by which movement to the steering-wheels of the vehicle is imparted. As the connecting mechanism between the shaft 9 and steering-wheels is well understood, the same is not illustrated and need not be described. The shaft 9 has a flattened head $9^a$, which takes into an elongated slot in one end of a link 10, the said link being pivoted at 11 to the plunger 8.

From the foregoing it will be seen that all of the threads of the worm are in uniform engagement with the adjacent teeth in the rack of plunger 8. Hence the wear is not confined to one tooth, as in the ordinary case, but is uniformly distributed throughout a number of teeth. By this arragement the freedom of operation of the apparatus is insured and its strength and durability substantially increased. In the form shown pivot 11 for the link 10 is placed intermediate the ends of the plunger 8, and hence the plunger 8 being supported at both ends takes the strain incidental to operation evenly throughout its entire bearing-surface, with the result that all tendency to bind or cramp is eliminated. Furthermore, by reason of the extreme length of the bearing for the part 8 the necessity of adjusting means is eliminated, because the wear is insignificant.

In operation as the shaft 1 is turned the plunger 8 is moved to and fro. This movement of the plunger changes the angle of the link 10 and to a similar extent the angle of the shaft 9. During this operation the link 10 slides upon the head $9^a$ of the shaft 9 to the necessary extent without binding by reason of the elongated slot in said link, in which said head is located. In one or both ends of that part of the casing in which the plunger 8 operates a removable cap 12 may be placed, whereby access may be afforded for the introduction of a suitable lubricant, such as grease. The part $2^a$ of the case may be screwed or bolted to the opposite part 2, so that access may be readily had to the entire apparatus for any purpose.

What I claim is—

1. In a steering apparatus, a rotatable shaft, bearings therefor, a worm on said shaft, a plunger arranged parallel to said shaft, a rack on one side of said plunger engaging said worm, a second shaft and a link connected thereto and to said plunger.

2. In a steering apparatus, a rotatable shaft, bearings therefor, a worm on said shaft, a plunger arranged parallel to said shaft, a rack on one side of said plunger engaging said worm, a second shaft, a link connected thereto and to said plunger, said link having a sliding movement relatively to one of said parts.

3. In a steering apparatus, a rotatable shaft, bearings therefor, a worm on said shaft, a plunger arranged parallel to said shaft, a rack on one side of said plunger engaging said worm, a second shaft, a link connected thereto and to said plunger, said link having a sliding movement relatively to said second shaft.

4. In a steering apparatus, a rotatable shaft, bearings therefor, a plunger arranged parallel thereto, a rack on one side of said plunger, a bearing for said plunger at each end thereof, a rack on one side of said plunger, a worm on said shaft engaging said rack at a point intermediate the length of the plunger, a second shaft and a link connecting said plunger and rack.

5. In a steering apparatus, a rotatable shaft, bearings therefor, adjustable means for said bearings, a plunger arranged parallel to said shaft, a rack on one side of said plunger, a worm on said shaft engaging said rack, a second shaft and a link connecting said plunger and said second shaft.

Signed at New Britain, Connecticut, this 15th day of September, 1904.

FRED H. BOGART.

Witnesses:
M. S. WIARD,
C. E. RUSSELL.